United States Patent [19]

Korsak

[11] 4,123,020

[45] Oct. 31, 1978

[54] VTOL LAUNCHING AND RETRIEVAL SYSTEMS

[76] Inventor: Kazimierz Korsak, 1568 Ellsmere Ave., Los Angeles, Calif. 90019

[21] Appl. No.: 786,683

[22] Filed: Apr. 11, 1977

Related U.S. Application Data

[63] Continuation-in-part of Ser. No. 660,642, Feb. 23, 1976, abandoned.

[51] Int. Cl.² ............................................. B64F 1/22
[52] U.S. Cl. .................................. 244/116; 244/115; 269/257; 294/67 BB
[58] Field of Search ............... 244/114 R, 100 R, 115, 244/116, 50, 64; 180/14 C; 294/67 BB, 67 R, 67 B, 86 R; 269/257, 264, 267

[56] References Cited

U.S. PATENT DOCUMENTS

| | | | |
|---|---|---|---|
| 1,582,482 | 4/1926 | Mraula | 244/64 |
| 2,426,585 | 9/1947 | Bean et al. | 244/100 R |
| 2,846,018 | 8/1958 | Puckett | 180/14 C |
| 2,877,911 | 3/1959 | Arnot | 180/14 C |
| 3,291,422 | 12/1966 | Valkenburg | 244/114 R |
| 3,552,689 | 1/1971 | Backken | 244/115 |
| 3,655,232 | 4/1972 | Martelee | 294/67 BB |
| 3,948,467 | 4/1976 | Krusius | 244/116 |

Primary Examiner—Galen L. Barefoot

[57] ABSTRACT

A VTOL launching and retrieval system comprising a single stud type primary landing gear and a mechanical arm equipped with a clamping device arranged to take hold of the VTOL while it is held in upright position using its own flight control system and it is either fully airborne or to some extent supported on its stud. The system allows an orderly transfer of the VTOL motion control from that by means of its flight controls to that by means of the mechanical arm which may be of flexible type, allowing to move the VTOL to stabilize in space its grasping digits or to move the VTOL from the landing site to a hangar.

2 Claims, 3 Drawing Figures

VTOL LAUNCHING AND RETRIEVAL SYSTEMS

CROSS REFERENCE TO RELATED APPLICATIONS

This specification is a continuation in part application and it replaces the specification filed in the Patent Office with application Ser. No. 660,642 — Group 315, filing date Feb. 23, 1976 now abandoned.

BACKGROUND OF THE INVENTION

This invention is an improvement in the field of launching and retrieval of vertical take-off and landing aircraft, known as VTOL.

Conventionally the VTOL is equipped with landing gear consisting of a number of legs which are adequate to support it on landing pads during take-offs and landings. On the ground the VTOL may be moved from the landing pad to a hangar and back to the landing pad using equipment operated by ground crew. Such system normally works satisfactorily in operation on solid ground and where the speed of the operation is not important and the ground crew is available.

However, where the VTOL must operate from a very limited size landing pad, such as for instance on a tower, a small ship or some moving ground vehicle, there is a need for automation of the launching and retrieval operations in which case the conventional system would have to be replaced by a more adaptable one.

In the past several devices were proposed for the operation from moving vehicles such as ships and some, such as Canadian "Bear Trap", French "Harpoon" etc are now in use on military ships, however, they all require complicated procedures for landing and for moving the VTOL to the hangar.

SUMMARY OF THE INVENTION

The object of the invention is to devise for the VTOL an improved launching and retrieval system which would allow an orderly transfer of the VTOL motion control from that by means of its flight control system to that by means of a mechanical arm, operating at the landing site.

Since the VTOL with conventional landing gear cannot conveniently meet the above objectives, it is proposed to equip the VTOL with a single stud type primary landing gear of cylindrical shape and with no other obstacles for a grasping arm, approaching said stud. For emergency landings the VTOL may be equipped with an auxiliary retractable landing gear.

With the stud type of the landing gear and with a mechanical arm, comprising a set of two grasping digits, said objectives can be met. Moving the VTOL on the landing site can be achieved by making said arm flexible, operable by actuators. Said flexibility of the arm can also be used to compensate for the motions of the moving vehicle, thus minimizing the motion of the grasping digits during landings.

The landing site may be provided with a computer which could control all the motions of the flexible arm.

DESCRIPTION OF THE DRAWINGS

Since the invention relates to the basic concept of the launching and retrieval system and not to the construction of anyone element thereof per se, the drawings have been presented more or less diagramatically. In these drawings:

Referring to FIG. 1, VTOL 1 is shown equipped with single stud 2 which can be of either fixed or a retractable type.

Said stud is composed of its upper part 3, housed in the VTOL fuselage, and of its lower part 4, protruding down from said fuselage. The lower part differs from any other landing gear leg in that it must be of very rugged construction, capable to withstand clamping by forces required to fully restrain the VTOL by friction. For this reason the shock absorbing parts perferably should be housed in upper part 3.

A conventional set of scissors 5 is shown as a preferable means of restraining the lower part from rotation in the upper part. This is need to prevent the rotation of the VTOL about its vertical axis with respect to the mechanical arm when it is holding said VTOL. The scissors are housed in the fuselage to leave an unostructed space around the stud.

Flange 6 is provided on lower part 4 to limit the area available for clamping, thus assuring proper functioning of the shock absorber. Said flange also allows to support the VTOL by the mechanical arm when the clamping is temporarily removed to rotate the VTOL if required, or for its launching.

Figure 1:
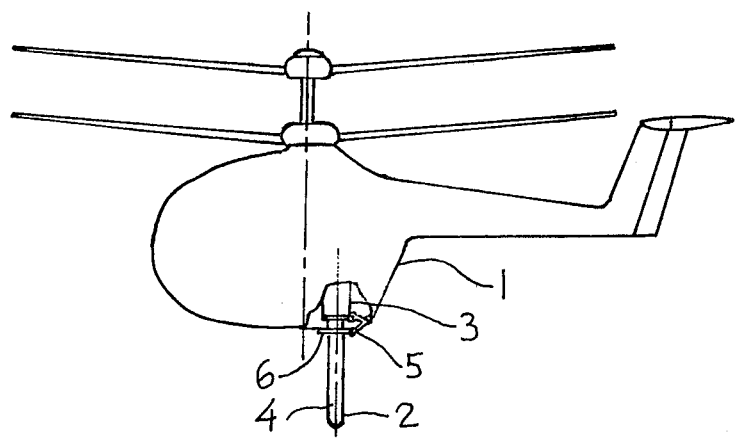
FIG. 1 is a side view of a VTOL, equipped with a single stud type landing gear.
Figure 2:
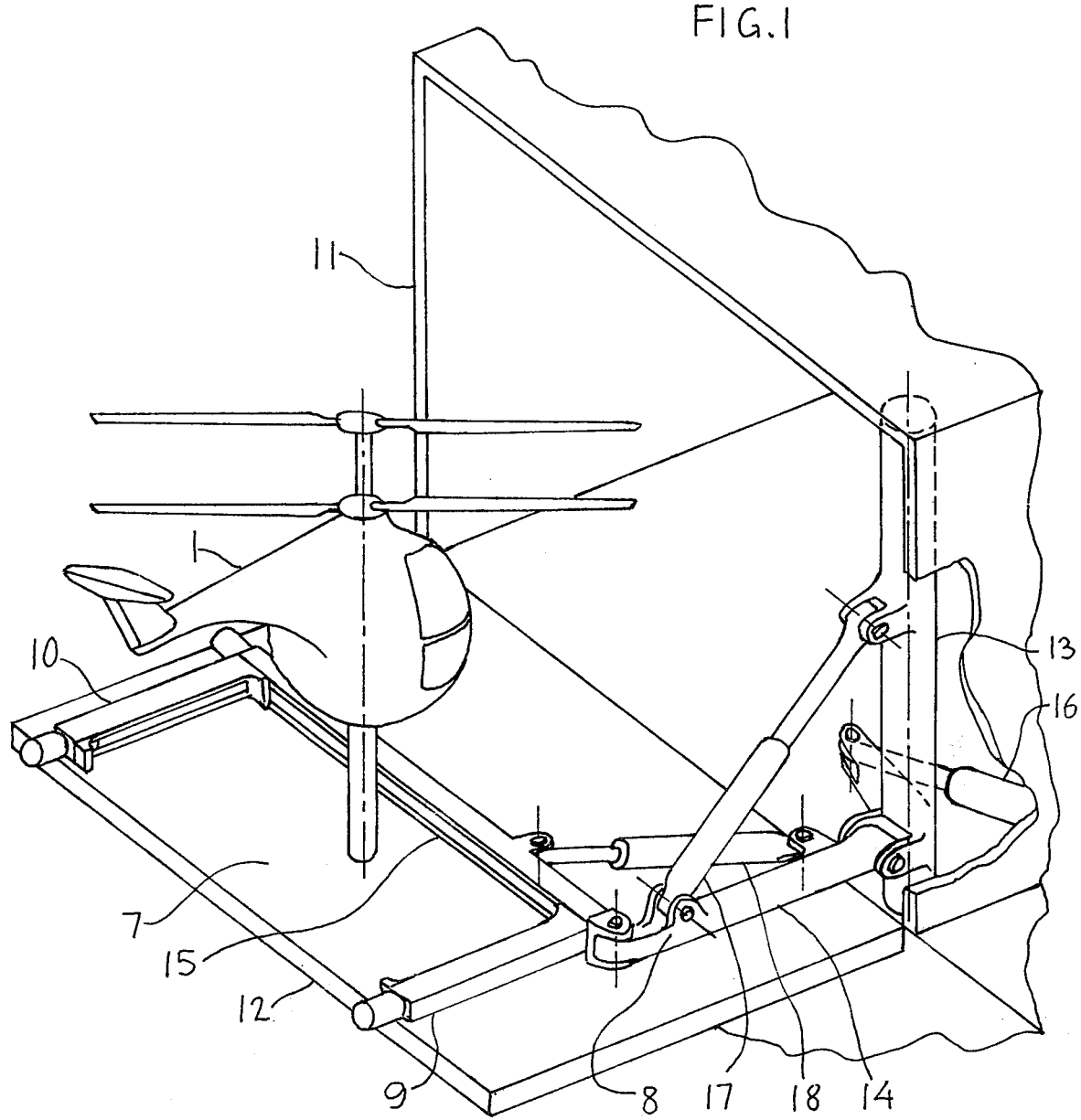
FIG. 2 is an isometric view of a landing site. It shows the VTOL held in upright position, partly supported with its stud resting on a landing pad, and ready for being grasped.

Referring to FIG. 2, VTOL 1 is shown held stationary in space by means of its flight control system and with the help from being partially supported by landing pad 7. Mechanical arm 8 is shown with its two digits 9 and 10 in their fully open position, ready to begin the operation of retrieval.

In the background is shown hangar 11 with its door 12 lowered to horizontal position so that it can serve as a landing pad 7.

FIG. 2 shows the preferred arrangement for the retrieval, however in cases when the mechanical arm is mounted on a moving vehicle and its digits are stabilized in space, resting on a landing pad may cause more harm than good and the VTOL should be retrieved while it is hovering at fixed altitude.

Mechanical arm 8 is shown comprising sectors 13, 14 and 15 which are hingedly connected to provide flexibility. Movements of said sectors are controlled preferably by hydraulic servo-actuators 16, 17 and 18 respectively.

For the purpose of the stabilization of the digits the operation of the actuators should be automated with a computer receiving inputs from a three dimensional sensor of accelerations of sector 15 which supports the digits.

For moving the VTOL from landing site to the hangar the actuators can be controlled manually.

Figure 3:
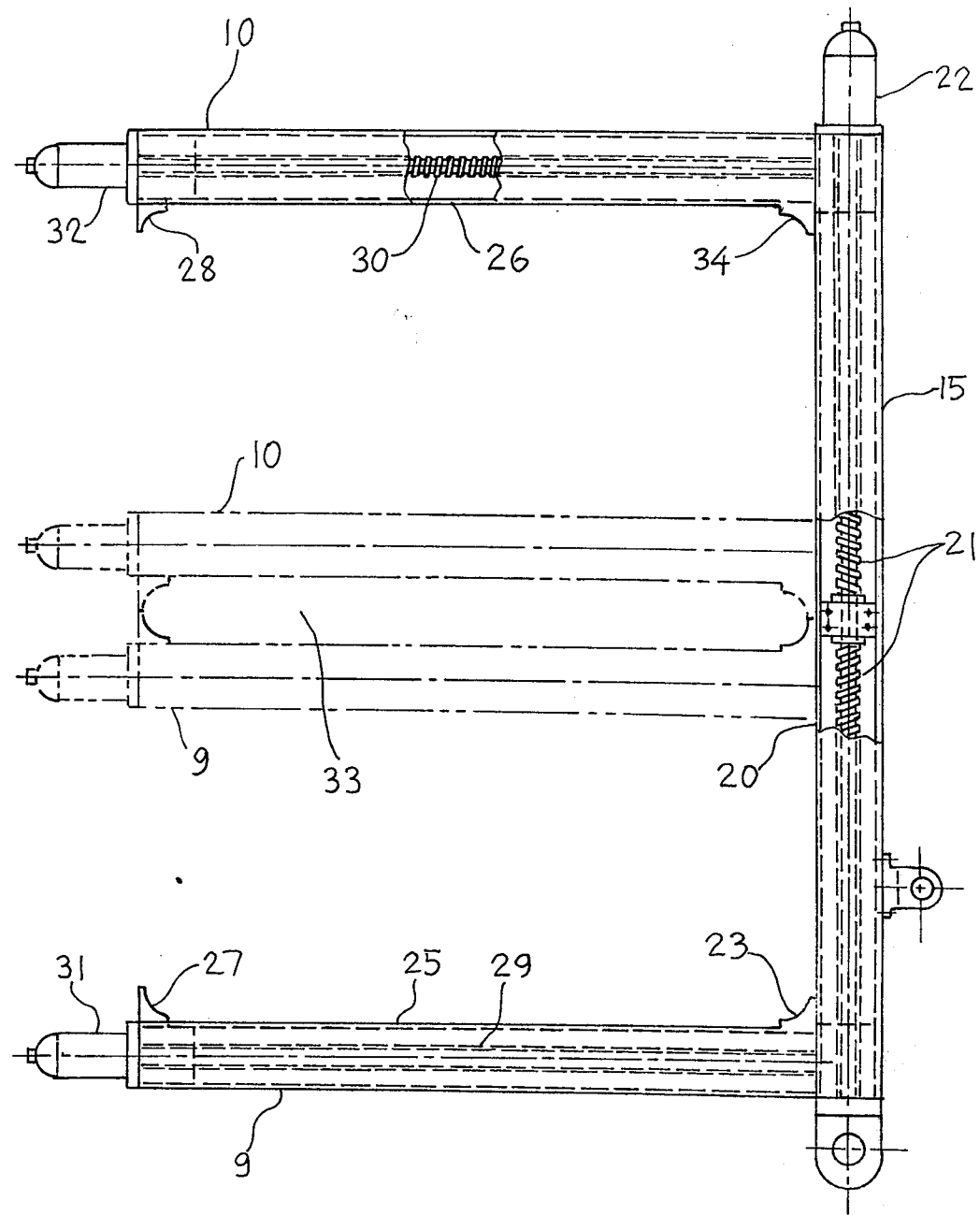
FIG. 3 is a plan view of a typical arrangement of digits of the mechanical arm.

Referring to FIG. 3, it shows details of operation of digits 9 and 10. Said digits are arranged to move on a track 20 of sector 15, by means of a right and left screw-jack 21 which is driven preferably by a hydraulic motor 22. At their base digits comprise stationary clamping jaws 23 and 24 and along their length they comprise tracks 25 and 26, in which movable clamping jaws 27 and 28 can move by means of screw-jacks 29 and 30 which are driven preferably by hydraulic motors 31 and 32 respectively.

The object of said digits is to guide said stud to a predetermined position in which it can be clamped to fully restrain the VTOL.

To commence the retrieval the VTOL must be held in a position within the reach of the mechanical arm. The retrieval is done in two stages as follows:

(a) In the first stage the digits move towards each other, guiding the stud into slot 33, formed by said digits when they reach their fully closed position (as shown on drawing in phantom lines).

(b) In the second stage which follows immediately after the first stage, movable clamping jaws 27 and 28 move towards stationary clamping jaws and 23 and 24, guiding the stud into the predetermined position where it is clamped thus completing the retrieval.

Alternatively one of the digits shown in FIG. 3 can be afixed to sector 15, screw-jack 21 is say right-handed on its full length so that the second digit can move to form slot 33. Also the movable clamping jaw on the afixed digit can be eliminated, and the other movable jaw can be re-shaped to adequately embrace the stud on clamping.

Another alternative would be: in lieu of digits moving in a slot of sector 15, having said digits hinged close to each other on sector 15, and having them swinging from a fully open to a fully closed position at which they would form a slot indentical with slot 33.

In these alternative arrangements the remaining parts of operations would remain unchanged.

Launching of the VTOL from the mechanical arm is very simple: upon the release of the stud clamping the VTOL becomes ready to lift-off on its own power.

I claim:

1. A VTOL launching and retrieval system using in combination:
   (a) a VTOL landing gear comprising in combination a single cylindrical stud having shock absorbing means, the structure of said stud being adequately rugged to withstand the clamping required to fully restrain said VTOL in a vertical direction by friction, without affecting the operation of said shock absorber and
   (b) a retrieval means at the landing site having a mechanical arm comprising: two digits, at least one of which is movable in an essentially horizonal plane from an open position to a closed position to guide said stud into a slot formed by said digits in said closed position; said mechanical arm further comprising stud clamping jaws, at least one of which is movable in said slot to further guide said stud in said horizontal plane to a predetermined position where it can be clamped by said jaws to fully restrain said VTOL, said combination thereby providing a VTOL retrieval by means of an orderly transfer of the control of the VTOL from that of its own flight control system to the control of said mechanical arm.

2. A VTOL launching and retrieval system set forth in claim 1 in which said mechanical arm having hingedly connected sectors and actuators allowing said arm to flex as required to stabilize said digits in space during VTOL retrieval when they tend to move due to motion of the support of said mechanical arm.

* * * * *